United States Patent
Zou

(10) Patent No.: US 7,992,025 B2
(45) Date of Patent: Aug. 2, 2011

(54) POWER CONTROL CIRCUIT

(75) Inventor: Hua Zou, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 471 days.

(21) Appl. No.: 12/277,253

(22) Filed: Nov. 24, 2008

(65) Prior Publication Data

US 2010/0100753 A1    Apr. 22, 2010

(30) Foreign Application Priority Data

Oct. 17, 2008    (CN) .......................... 2008 1 0304977

(51) Int. Cl.
*G06F 1/00* (2006.01)

(52) U.S. Cl. ...................................... 713/323; 713/340

(58) Field of Classification Search ........... 713/323–340
See application file for complete search history.

(56) References Cited

U.S. PATENT DOCUMENTS

| 7,030,681 B2 * | 4/2006 | Yamazaki et al. ............ 327/534 |
| 2010/0156883 A1 * | 6/2010 | Yamato et al. ................ 345/213 |

* cited by examiner

*Primary Examiner* — Clifford Knoll
(74) *Attorney, Agent, or Firm* — Zhigang Ma

(57) ABSTRACT

A power control circuit for supplying power for a computer component of a computer includes first to sixth switches. In response to the computer changing to a normal work state, a power state signal changes from low level to high level and a motherboard state signal is at high level, the fourth switch is turned on, the fifth switch is turned off, and the sixth switch is turned on, and power of the computer component is stably supplied by a system power supply. The motherboard state signal and the power state signal are at low level in response to the computer changing to a sleep state, the second switch is turned off, the first and third switches are turned on, and power of the computer component is stably supplied by a standby power supply.

12 Claims, 2 Drawing Sheets

POWER CONTROL CIRCUIT

BACKGROUND

1. Technical Field

The present disclosure relates to power control circuits, and particularly to a power control circuit for supplying power for an electronic component of a computer.

2. Description of Related Art

Computer power supplies are generally used for supplying power to different electronic components, such as mice and keyboards in computer systems. There are several types of computer power supplies, such as an advanced technology extended (ATX) power supply, which is configured for generating power state signals to provide to the electronic component. After a computer is changed from one state to another state, such as from a shutdown state to a normal work state, a power state signal is changed from low level to high level. Electronic components of the computer are supplied power stably as long as the power state signal remains high. However, if the computer state changes, power to the electronic components may become unstable.

What is needed, therefore, is to provide a power control circuit to overcome the above described shortcomings.

DETAILED DESCRIPTION

Figure 1:
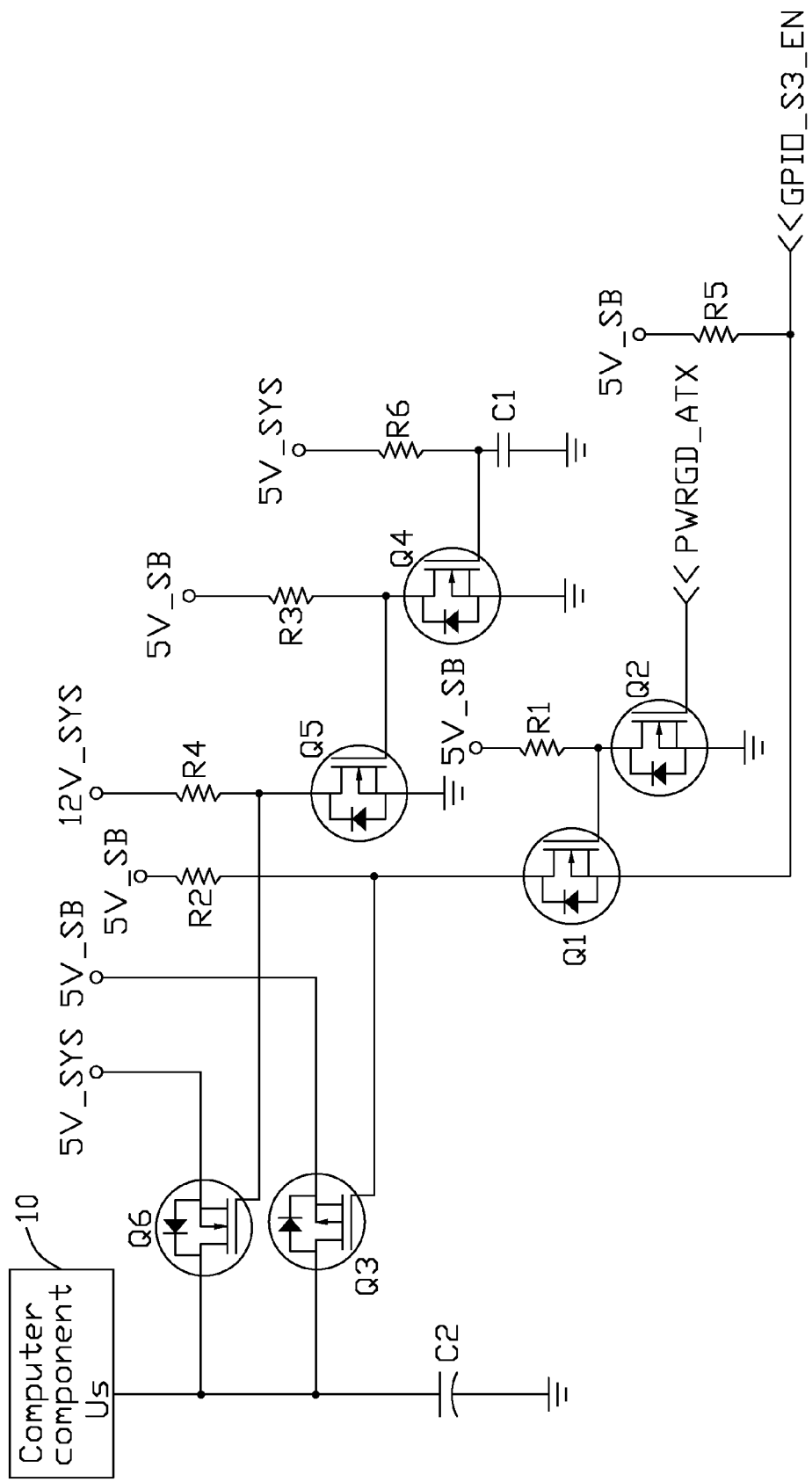
FIG. 1 is a circuit diagram of a first exemplary embodiment of a power control circuit.

Referring to FIG. 1, a first exemplary embodiment of a power control circuit of a computer includes six field effect transistors (FETs) Q1-Q6, six resistors R1-R6, and two capacitors C1 and C2. The power control circuit is connected between an ATX power supply (not shown) and a computer component 10 of the computer for controlling the ATX to supply power to the computer component 10. The ATX includes a 5V standby (5V_SB) power supply, a 5V system (5V_SYS) power supply, a 12V system (12V_SYS) power supply, and a power state pin configured for supply a power state signal PWRGD_ATX. The computer component 10 includes a power terminal Us, and can be a mouse or a keyboard for example.

A source of the FET Q1 is connected to the 5V_SB power supply via the resistor R5, and connected to a south bridge chip (not shown) of a motherboard of the computer to receive a motherboard state signal GPIO_S3_EN. A gate of the FET Q1 is connected to a drain of the FET Q2, and connected to the 5V_SB power supply via the resistor R1. A drain of the FET Q1 is connected to the 5V_SB power supply via the resistor R2, and connected to a gate of the FET Q3. A gate of the FET Q2 is connected to the power state pin to receive the power state signal PWRGD_ATX. A source of the FET Q2 is grounded. A gate of the FET Q4 is connected to the 5V_SYS power supply via the resistor R6, and grounded via the capacitor C1. A source of the FET Q4 is grounded. A drain of the FET Q4 is connected to the 5V_SB power supply via the resistor R3, and connected to a gate of the FET Q5. A source of the FET Q5 is grounded. A drain of the FET Q5 is connected to the 12V_SYS power supply via the resistor R4, and connected to a gate of the FET Q6. A source of the FET Q6 is connected to the 5V_SYS power supply. A source of the FET Q3 is connected to the 5V_SB power supply. Both the two drains of the FETs Q6 and Q3 are connected to the power terminal Us of the computer component 10, and grounded via the capacitor C2.

The FETs Q1-Q6 are used as electrical switches. In this illustrated embodiment, the FETs Q1, Q2, Q4, Q5, and Q6 are N-channel metal oxide semiconductor (NMOS) FETs, the FET Q3 is a P-channel metal oxide semiconductor (PMOS) FET. In other embodiments, all the electrical switches may be other types of electrical switches, such as transistors. If the FETs Q1, Q2, Q4, Q5, and Q6 are replaced by negative-positive-negative transistors and the FET Q3 is replaced by a positive-negative-positive transistor, a base, an emitter, and a collector of the negative-positive-negative transistor or the positive-negative-positive transistor correspond to the first, second, and third terminals of the FETs. The capacitor C2 may be an electrolytic capacitor or another type of capacitor, such as a solid state capacitor.

Work states of the computer includes a shutdown state via software, a normal work state, and a sleep state. Thus, the computer can be changed from the shutdown state via software to the normal work state, from the normal work state to the sleep state, or from the sleep state to the normal work state.

The motherboard state signal GPIO_S3_EN can be set at high or low level in each computer state in a basic input and output system (BIOS) of the computer. In one embodiment, the motherboard state signal GPIO_S3_EN is at high level (e.g., about 5 volts) in the normal work state and the shutdown state, but is at low level (e.g., about 0 volts) in the sleep state of the computer.

The power state signal PWRGD_ATX is at low level (e.g., about 0 volts) in the shutdown state, and changes from low level to high level (e.g., about 5 volts) in the normal work state by delaying a period of time, such as 100 ms or 400 ms.

When the computer is in the shutdown state, the power state signal PWRGD_ATX is at low level, the motherboard state signal GPIO_S3_EN is at high level, the 5V_SYS and 12V_SYS do not supply power, the 5V_SB power supply supplies power, the gate of the FET Q2 is at low level resulting in the FET Q2 being turned off. The FETs Q1, Q3, and Q4 are all turned off, while the FET Q5 is turned on, the gate of the FET Q6 is at low level resulting in the FET Q6 being turned off. Thus, power is not supplied to the power terminal Us of the computer component 10.

When the computer is changed to the normal work state, the power state signal PWRGD_ATX is at low level and the motherboard state signal GPIO_S3_EN is at high level firstly, the 5V_SYS and 12V_SYS power supplies supply power, the gate of the FET Q2 is at low level resulting in the FET Q2 being turned off. The FETs Q1 and Q3 are turned off. The gate of the FET Q4 is at high level resulting in the FET Q4 being turned on. The gate of the FET Q5 is at low level resulting in the FET Q5 being turned off, the FET Q6 is turned on, and the 5V_SYS power supply supplies power to the power terminal Us of the computer component 10. When the power state signal PWRGD_ATX changes to high level because of the normal work state of the computer, the gate of the FET Q2 is at high level resulting in the FET Q2 being turned on. The FETs Q1 and Q3 are turned off, the FET Q4 is still turned on, and the FET Q5 is turned off. The FET Q6 is still turned on, thus the 5V_SYS power supply stably supplies power to the power terminal Us of the computer component 10. Therefore, when the computer is changed from the shutdown state to the normal work state, the power state signal PWRGD_ATX is changed from low level to high level, the power terminal Us of the computer component 10 is stable supplied the 5V_SYS power supply.

When the computer is changed to the sleep state, the power state signal PWRGD_ATX and the motherboard state signal GPIO_S3_EN are both at low level, the 5V_SYS and 12V_SYS power supplies do not supply power, the 5V_SB power supply supplies power. The FET Q2 is turned off, the gate of the FET Q1 is at high level resulting in the FET Q4 being turned on, and the FET Q3 is turned on, and the 5V_SB power supply is supplied to the power terminal Us of the computer component 10. The gate of the FET Q4 is at low level resulting in the FET Q4 being turned off. The gate of the FET Q5 is at high level resulting in the FET Q5 being turned on, and the FET Q6 is turned off. Therefore, when the computer is changed from the normal work state to the sleep state, the power terminal Us of the computer component 10 is supplied with the 5V_SB power supply.

When the computer is awakened and changes to the normal work state, operation of the power control circuit is similar to the operation of the power control circuit when the computer changes from the shutdown state to the normal work state. That is, when the power state signal PWRGD_ATX changes from low level to high level, the power terminal Us of the computer component 10 is stably supplied with the 5V_SYS power supply.

Figure 2:
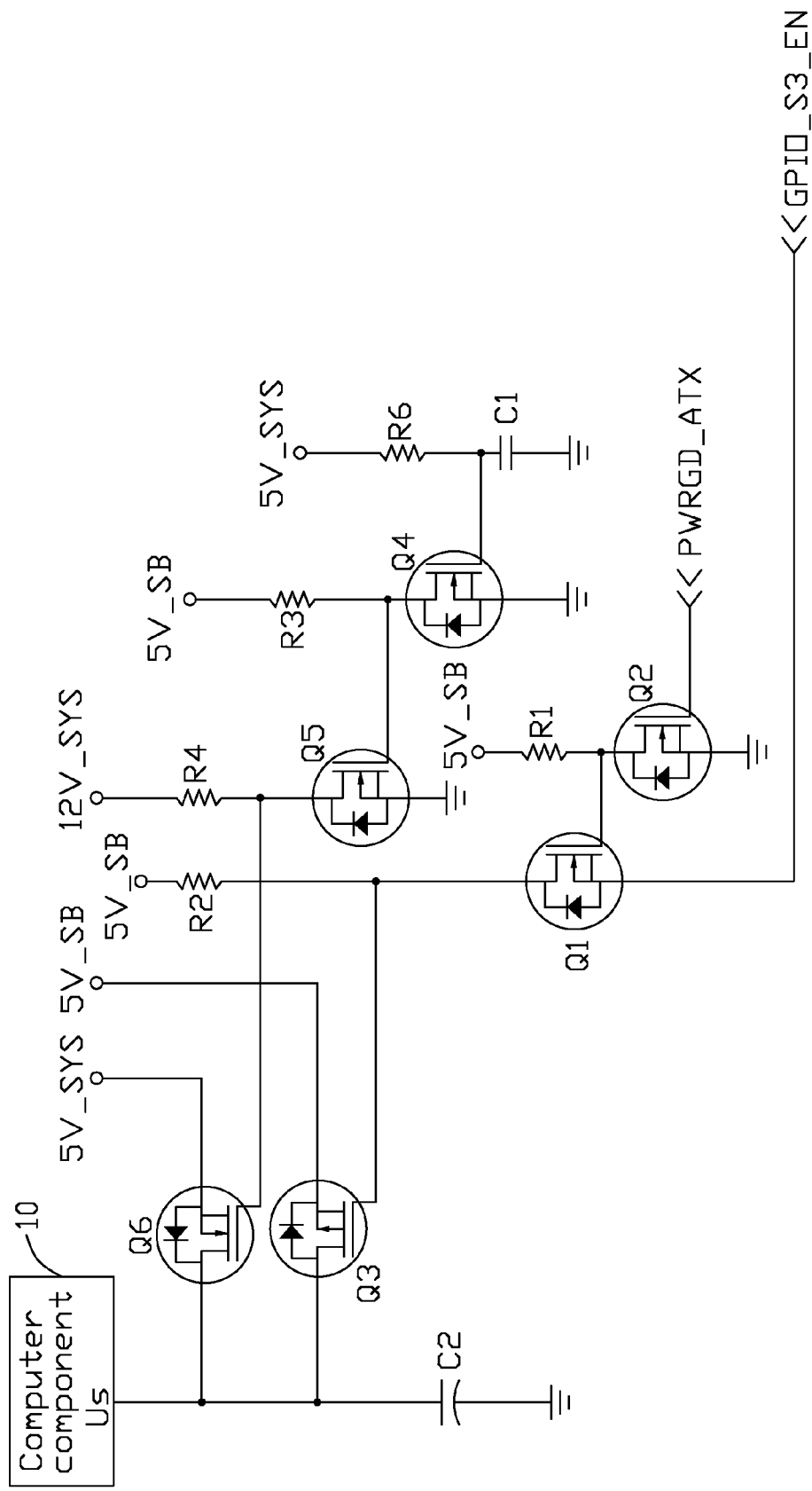
FIG. 2 is a circuit diagram of a second exemplary embodiment of a power control circuit.

Referring to FIG. 2, a second exemplary embodiment of a power control circuit of a computer is shown. In this embodiment, the resistor R5 is omitted from the power control circuit without substantially deviating away from the sprit of the invention.

In other embodiments, the resistor R6, the capacitors C1 and C2 can be omitted from the power control circuit without substantially deviating away from the sprit of the invention.

It is to be understood, however, that even though numerous characteristics and advantages of the embodiments have been set forth in the foregoing description, together with details of the structure and function of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

What is claimed is:

1. A power control circuit for supplying power for a computer component of a computer, the power control circuit comprising:
    a first switch comprising a first terminal connected to a standby power supply via a first resistor, a second terminal to receive a motherboard state signal from a motherboard of the computer, and a third terminal connected to the standby power supply via a second resistor;
    a second switch comprising a first terminal to receive a power state signal from the standby power supply, a second terminal grounded, and a third terminal connected to the first terminal of the first switch, configured for being turned on when the power state signal is at high level, and for being turned off when the power state signal is at low level;
    a third switch comprising a first terminal connected to the third terminal of the first switch, a second terminal connected to the standby power supply, a third terminal connected to a power terminal of the computer component to supply power to the computer component, and configured for being turned on when the first switch is turned off, and for being turned off when the first switch is turned on;
    a fourth switch comprising a first terminal connected to a first system power supply, a second terminal grounded, a third terminal connected to the standby power supply via a third resistor, and configured for being turned on when the first system power supply is powered;
    a fifth switch comprising a first terminal connected to the third terminal of the fourth switch, a second terminal grounded, a third terminal connected to a second system power supply via a fourth resistor, and configured for being turned on when the fourth switch is turned off, and for being turned off when the fourth switch is turned on; and
    a sixth switch comprising a first terminal connected to the third terminal of the fifth switch, a second terminal connected to the first system power supply, a third terminal connected to the power terminal of the computer component, and configured for being turned on when the fifth switch is turned off, and for being turned off when the fifth switch is turned on;
    wherein in response to the computer changing to a normal work state, the power state signal changes from low level to high level and the motherboard state signal is at high level, the fourth switch is turned on, the fifth switch is turned off, and the sixth switch is turned on, the power terminal of the computer component is stably supplied power by the first system power supply;
    wherein the motherboard state signal and the power state signal are at low level in response to the computer changing to a sleep state, the second switch is turned off, the first and third switches are turned on, the power terminal of the computer component is stably supplied power by the standby power supply.

2. The power control circuit of claim 1, further comprising a fifth resistor connected between the standby power supply and the second terminal of the first switch.

3. The power control circuit of claim 1, further comprising a sixth resistor and a first capacitor, wherein the sixth resistor is connected between the first system power supply and the first terminal of the fourth switch, the first capacitor is connected between the first terminal of the fourth switch and ground.

4. The power control circuit of claim 1, further comprising a second capacitor connected between the power terminal of the computer component and ground.

5. The power control circuit of claim 4, wherein the second capacitor is an electrolytic capacitor.

6. The power control circuit of claim 4, wherein the second capacitor is a solid state capacitor.

7. The power control circuit of claim 1, wherein the first system power supply and the standby power supply are 5 volt power supplies, the second system power supply is a 12 volt power supply.

8. The power control circuit of claim 1, wherein the first, second, fourth, fifth, and sixth switches are N-channel metal oxide semiconductor field effect transistor, the third switch is a P-channel metal oxide semiconductor field effect transistor; a gate, a source, and a drain correspond to the first, second, and third terminals of each of the first to sixth switches.

9. The power control circuit of claim 1, wherein the first, second, fourth, fifth, and sixth switches are negative-positive-negative transistors, the third switch is a positive-negative-positive transistor; a base, an emitter, and a collector correspond to the first, second, and third terminals of the first to sixth switches.

10. The power control circuit of claim 1, wherein the computer component is a mouse.

11. The power control circuit of claim 1, wherein the computer component is a keyboard.

12. The power control circuit of claim 1, wherein the high level is about 5 volts, and the low level is about 0 volts.

* * * * *